(12) United States Patent
Kobayashi

(10) Patent No.: US 7,973,854 B2
(45) Date of Patent: Jul. 5, 2011

(54) IMAGE PICKUP APPARATUS HAVING MECHANISMS FOR HOLDING AN IMAGE PICKUP ELEMENT

(75) Inventor: Futoshi Kobayashi, Tokyo (JP)

(73) Assignee: Canon Kabushiki Kaisha (JP)

( * ) Notice: Subject to any disclaimer, the term of this patent is extended or adjusted under 35 U.S.C. 154(b) by 411 days.

(21) Appl. No.: 12/021,508

(22) Filed: Jan. 29, 2008

(65) Prior Publication Data

US 2008/0180562 A1 Jul. 31, 2008

(30) Foreign Application Priority Data

Jan. 31, 2007 (JP) .................................. 2007-021131

(51) Int. Cl.
*H04N 5/76* (2006.01)
*H04N 5/225* (2006.01)

(52) U.S. Cl. ........................................ 348/373; 348/374

(58) Field of Classification Search ........... 348/373–374
See application file for complete search history.

(56) References Cited

U.S. PATENT DOCUMENTS

| 5,381,176 A * | 1/1995 | Tanabe et al. .................. 348/273 |
| 7,034,882 B2 * | 4/2006 | Kato et al. ...................... 348/335 |
| 7,324,148 B2 | 1/2008 | Takizawa et al. |
| 2004/0227845 A1 * | 11/2004 | Kawai ............................ 348/360 |
| 2004/0233303 A1 * | 11/2004 | Okutani et al. ............. 348/240.3 |
| 2007/0296819 A1 | 12/2007 | Takizawa et al. |
| 2009/0051803 A1 * | 2/2009 | Takizawa et al. ............. 348/340 |

FOREIGN PATENT DOCUMENTS

| JP | 2003-348403 A | 12/2003 |
| JP | 2005-12334 A | 1/2005 |
| JP | 2006-67356 A | 3/2006 |
| JP | 2006-6211438 A | 8/2006 |
| JP | 2006-301187 A | 11/2006 |

OTHER PUBLICATIONS

Office Action issued in corresponding Chinese Patent Application No. 2008100052212 dated Aug. 14, 2009.

* cited by examiner

*Primary Examiner* — Hung H Lam
(74) *Attorney, Agent, or Firm* — Rossi, Kimms & McDowell LLP

(57) ABSTRACT

An image pickup apparatus which permits reduction of the thickness of a mechanism for holding an optical filter component and prevents failure of the optical filter component. A CCD is configured to convert an object image having passed through the photographic lens into an electric signal. A CCD plate holds the CCD. A CCD rubber is disposed on the object-side surface of the CCD, and an optical LPF is disposed on the object-side surface of the CCD rubber. An LPF cover is opposed to the CCD rubber in a manner sandwiching the optical LPF between the CCD rubber and the LPF cover itself. The LPF cover is supported by the CCD plate such that the CCD, the CCD plate, the CCD rubber, the optical LPF, and the LPF cover are combined into a unitary assembly.

3 Claims, 5 Drawing Sheets

IMAGE PICKUP APPARATUS HAVING MECHANISMS FOR HOLDING AN IMAGE PICKUP ELEMENT

BACKGROUND OF THE INVENTION

1. Field of the Invention

The present invention relates to an image pickup apparatus, and more particularly to an image pickup apparatus characterized by a technique for fixing an image pickup element within a barrel.

2. Description of the Related Art

An electronic still camera, i.e. a so-called digital camera, which converts an object image formed by a photographic optical system into an electric signal using an image pickup element, such as a CCD or a MOS are in widespread use. Some of the image pickup elements, such as a CCD and a MOS, are sensitive to infrared light invisible to the human eye, and hence, some digital cameras have an infrared ray cut filter provided in its photographic optical system so as to prevent degradation of image quality due to infrared light.

Further, some image pickup apparatuses have an optical low-pass filter made of a crystal exhibiting birefringent phenomenon and disposed on the object-side front surface of an image pickup element so as to prevent degradation of image quality due to false colors or moire caused by picking up an image of an object containing a sampling frequency dependent on the pixel pitch of the image pickup element.

The infrared ray cut filter or optical low-pass filter (hereinafter referred to as "the optical filter component"), or both of them are held by a base plate formed with an opening for passing photographic optical flux therethrough and a recess for positioning the optical filter component without large displacement. More specifically, the optical filter component is held by being fitted and glued in the base plate.

By the way, when dust adheres to the surface of an image pickup element, light is not admitted through a portion where the dust is adhering, and hence the image of the dust is captured as a shadow in an object image, and the image of the shadow is formed in a picked-up image. Further, an image pickup element is generally located inward of a shooting lens, and hence it is impossible for the user to clean the image pickup element. Therefore, in order to avoid picking up the image of dust, the image pickup apparatus is required to have a structure that makes it possible to prevent dust from adhering to the image pickup element. For this reason, the image pickup element generally has a front surface thereof covered by a protective glass.

However, when a large piece of dust adheres to the protective glass, the image of the dust can be picked up. To solve this problem, there has been proposed an image pickup apparatus in which a space between an optical filter component and a protective glass is hermetically sealed so as to prevent dust from adhering to the protective glass.

Furthermore, a mechanism for performing fine adjustment of the position and attitude of an imaging surface is sometimes required so as to accommodate manufacturing errors of the photographic optical system. Improvement of assemblability of the optical filter component and the image pickup element is always required for reduction of assembling costs. In addition, the thickness of the optical system in the optical axis direction should be smaller so as to enhance the portability of the image pickup apparatus.

Conventionally, in order to reduce thickness of a structure of an optical filter component and a protective glass with a space therebetween hermetically sealed, in the direction of the optical axial of the optical system, there have been proposed various mechanisms for holding the image pickup element and the optical filter component in a barrel.

For example, in a technique disclosed in Japanese Laid-Open Patent Publication (Kokai) No. 2006-67356, a low-pass filter holder formed by a metal member in the form of a thin plate for holding the optical filter component is provided so as to reduce the thickness of the optical system in the optical axis direction. Further, in a technique disclosed in Japanese Laid-Open Patent Publication (Kokai) No. 2005-12334, the optical filter component and the image pickup element are held by being rigidly glued to each other.

Japanese Laid-Open Patent Publication (Kokai) No. 2006-67356 mentioned above discloses a construction in which the optical filter component held in the low-pass filter holder has an elastic member provided thereunder and the elastic member is sandwiched between the image pickup element and the optical filter component. However, in the case of this construction, excessive pressure can be applied to the optical filter component depending on variation in the thickness of the optical filter component, thereby causing failure of the optical filter component.

On the other hand, in the technique disclosed in Japanese Laid-Open Patent Publication (Kokai) No. 2005-12334, the optical filter component and the image pickup element are glued to each other, and hence it is required to hold the optical filter component until an adhesive is cured, which degrades the assemblability. Further, it is difficult to separate the optical filter component and the image pickup element, and hence when one of the two components fails, the other component, which is normal, has to be disposed of as junk.

Furthermore, neither of Japanese Laid-Open Patent Publications (Kokai) No. 2006-67356 and No. 2005-12334 permit adjustment of the position of the image pickup surface in the optical axis direction nor the inclination of the same with respect to the optical axis.

SUMMARY OF THE INVENTION

The present invention provides an image pickup apparatus which permits reduction of the thickness of a mechanism thereof for holding an optical filter component and at the same time prevents failure of the optical filter component.

In a first aspect of the present invention, there is provided an image pickup apparatus comprising a photographic optical system, an image pickup element configured to convert an object image having passed through the photographic optical system into an electric signal, a holding member configured to hold the image pickup element, a first elastic member disposed on an object-side surface of the image pickup element, an optical member disposed on an object-side surface of the first elastic member, and a second elastic member opposed to the first elastic member such that the second elastic member and the first elastic member sandwich the optical member therebetween, wherein the first elastic member has a hollow frame shape and is held in intimate contact with the image pickup element, and the optical member, and the second elastic member is supported by the holding member such that the image pickup element, the holding member, the first elastic member, the optical member, and the second elastic member are combined into a unitary assembly.

The image pickup apparatus according to the first aspect of the present invention has the photographic optical system, the image pickup element configured to convert an object image having passed through the photographic optical system into an electric signal, the holding member configured to hold the image pickup element, and the first elastic member disposed on the object-side surface of the image pickup element. Further, the image pickup apparatus has the optical member disposed on the object-side surface of the first elastic member, and the second elastic member opposed to the first elastic member such that the second elastic member and the first elastic member sandwich the optical member therebetween. The first elastic member has a hollow frame shape and is held in intimate contact with the image pickup element and the optical member, and the second elastic member is supported by the holding member such that the image pickup element, the holding member, the first elastic member, the optical member, and the second elastic member are combined into a unitary assembly.

This arrangement makes it possible to reduce the thickness of the mechanism for holding the optical filter component and prevents failure of the optical filter component.

In a second aspect of the present invention, there is provided an image pickup apparatus comprising a photographic optical system, an image pickup element configured to convert an object image having passed through the photographic optical system into an electric signal, a holding member configured to hold the image pickup element, a first elastic member disposed on an object-side surface of the image pickup element, an optical member disposed on an object-side surface of the first elastic member, a second elastic member opposed to the first elastic member such that the second elastic member and the first elastic member sandwich the optical member therebetween, a barrel configured to hold the photographic optical system, and a third elastic member disposed between the barrel and the second elastic member, wherein the third elastic member urges the second elastic member in a direction for contact with the holding member or the image pickup element to combine the image pickup element, the holding member, the first elastic member, the optical member, and the second elastic member into a unitary assembly.

The features and advantages of the invention will become more apparent from the following detailed description taken in conjunction with the accompanying drawings.

DETAILED DESCRIPTION OF THE PREFERRED EMBODIMENTS

The present invention will now be described in detail with reference to the drawings showing a preferred embodiment thereof.

Figure 1:
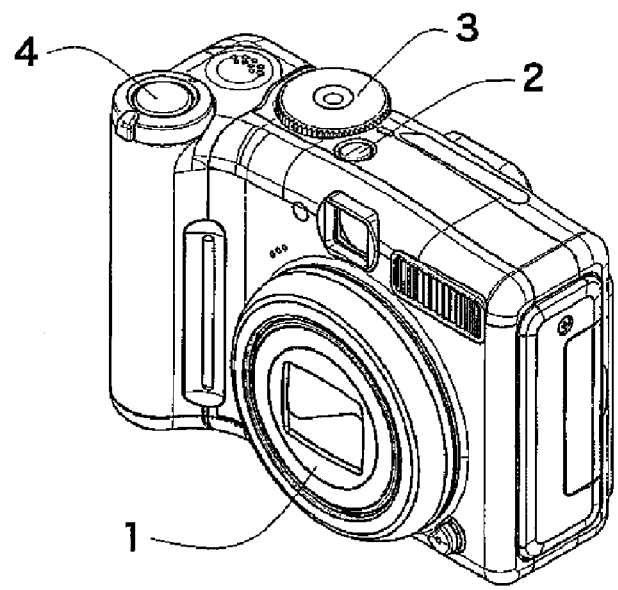
FIG. 1 is a perspective view of the appearance of a digital camera as an image pickup apparatus according to an embodiment of the present invention, in a retracted state.

FIG. 1 is a perspective view of the appearance of a digital camera implementing an image pickup apparatus according to the embodiment of the present invention, in a retracted state.

Hereafter, the construction of the digital camera will be described together with operation thereof, with reference to FIG. 1 and the other drawings.

Referring to FIG. 1, a photographic lens 1 is in the retracted state for storage, with a power supply kept off so as to inhibit shooting. The power supply of the digital camera can be turned on by operating a power button 2. Further, a user can select a shooting mode by operating a mode dial 3. A release button 4 will be described hereinafter.

Figure 2:
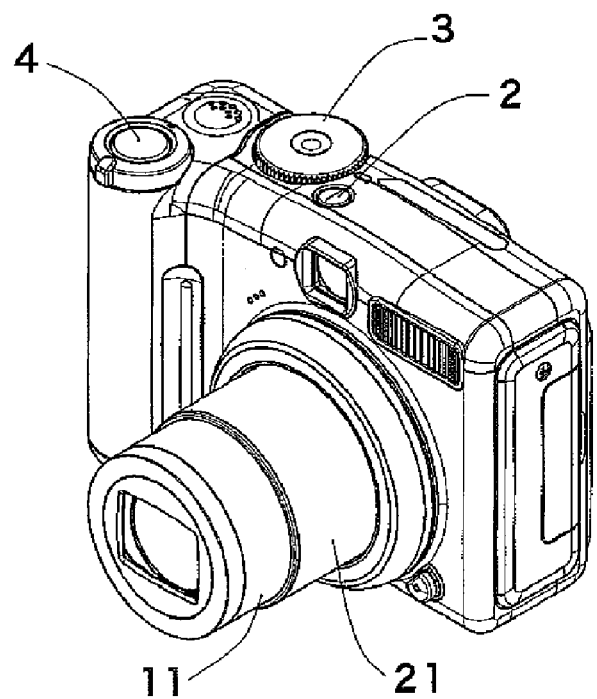
FIG. 2 is a perspective view of the appearance of the digital camera in a shooting mode state.

FIG. 2 is a perspective view of the appearance of the digital camera according to the present embodiment, in a shooting mode state.

Referring to FIG. 2, in the shooting mode, it is possible to pick up an object via the photographic lens 1 by pressing the release button 4. A first-group holder 11 and a first-group guide barrel 21 will be described hereinafter.

Figure 3:
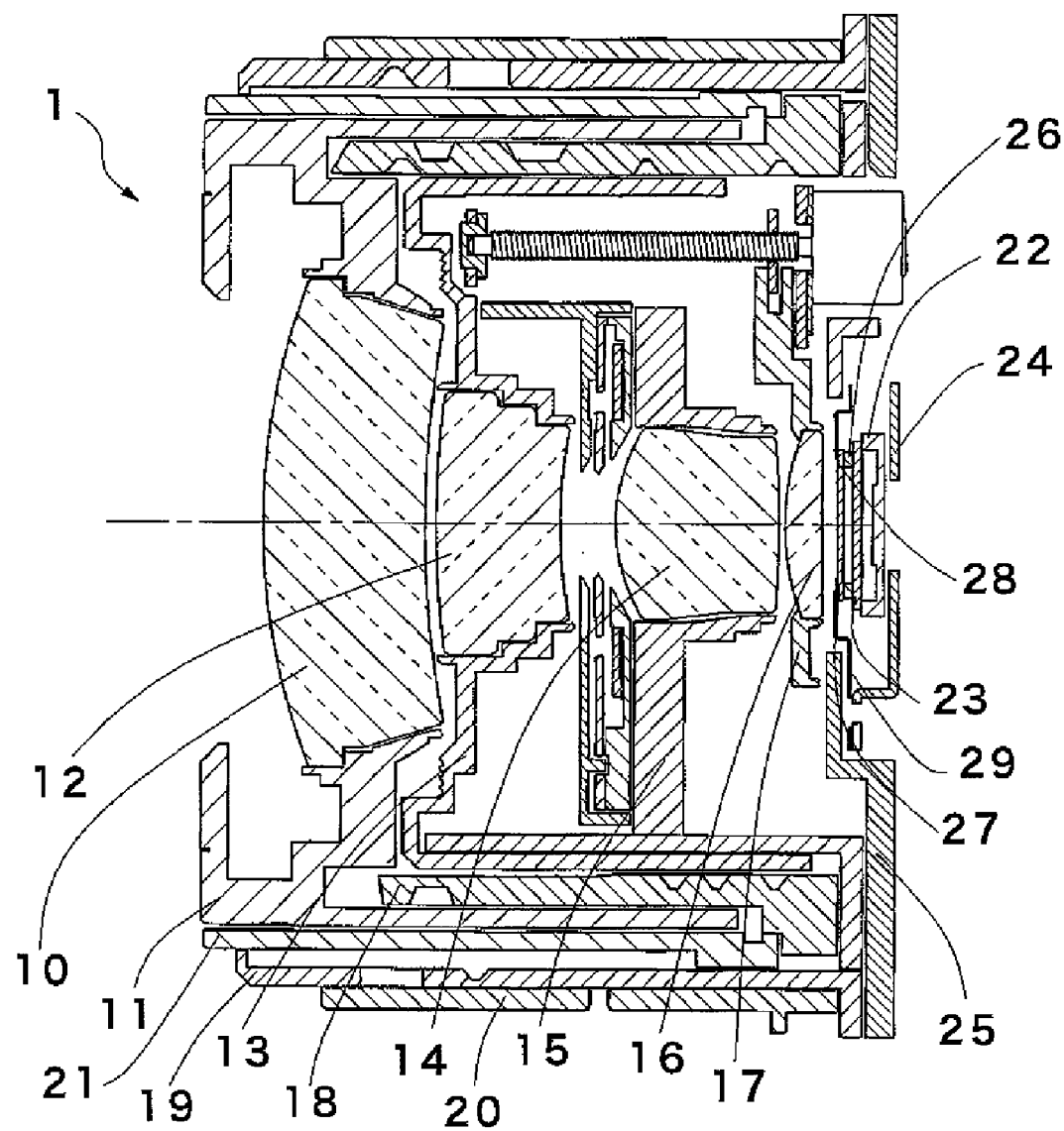
FIG. 3 is a cross-sectional view of a photographic lens appearing in FIG. 1, in the retracted state.

FIG. 3 is a cross-sectional view of the photographic lens appearing in FIG. 1, in the retracted state.

Referring to FIG. 3, a first-group lens 10 is held by the first-group holder 11. Similarly, a second-group lens 12 is held by a second-group holder 13, a third-group lens 14 by a third-group holder 15, and a fourth-group lens 16 by a fourth-group holder 17.

A cam ring 18 in the form of a hollow cylinder has an inner peripheral surface thereof formed with cam grooves, not shown, for shifting the second-group holder 13 and the third-group holder 15 in the optical axis direction. The second-group holder 13 and the third-group holder 15 each have cam follower pins implanted thereon for cam engagement with the respective cam grooves formed in the inner peripheral surface of the cam ring 18. Further, the cam ring 18 has an outer peripheral surface thereof formed with cam grooves, not shown, for shifting the first-group holder 11 in the optical axis direction, and cam follower pins implanted on the first-group holder 11 are in cam engagement with the respective cam grooves.

A fixed barrel 19 has an inner peripheral surface thereof formed with cam grooves for extending the cam ring 18 in the optical axis direction. A drive ring 20 is a hollow cylindrical member that is rotated about the optical axis by a driving force from a drive source as the power of the digital camera is turned on and the digital camera shifts to the shooting mode. The cam ring 18 is engaged with the drive ring 20 such that the cam ring 18 rotates in accordance with rotation of the drive ring 20. As the drive ring 20 rotates, the cam ring 18 moves in the optical axis direction while rotating along the cam grooves of the fixed barrel 19.

The first-group guide barrel 21 is a component part that supports the first-group holder 11 such that the first-group holder 11 can move back and forth in the optical axis direction, and conceals a gap formed between the first-group holder 11 and the fixed barrel 19 when the photographic lens 1 is extended.

The fourth-group lens 16 is a so-called focusing lens having a function of focusing an object on an image pickup surface by being moved in the optical axis direction by a screw feed mechanism according to the distance of the object.

In FIG. 3, the photographic lens 1 is in the retracted state in which the fourth-group holder 17 and the fourth-group lens 16 have been moved to a position closest to the image pickup surface so as to shorten the length of the barrel in the retracted state.

An object image formed through the first-group lens 10 to the fourth-group lens 16 is converted into an electric signal by a CCD 22 as an image pickup element. A protective glass 23 is secured to the object-side front surface of the CCD 22, for protecting the CCD 22. Further, the CCD 22 is rigidly glued to a CCD plate 24. The CCD plate 24 is fastened to a predetermined portion of the CCD 25 by screws.

On the object-side front surface of the protective glass 23, there is disposed a CCD rubber 26 formed with an opening via which an object light flux passes. Further, an optical LPF 27 and a CCD mask 28 are overlaid on the object-side front surface of the CCD rubber 26 in the mentioned order.

Furthermore, an LPF cover 29 is disposed on the object-side front surface of the CCD mask 28. The LPF cover 29 is fixed to the CCD plate 24 by screws 30, referred to hereinafter.

Next, the arrangement of the CCD 22 and component parts associated therewith will be described in more detail with reference to FIG. 4.

Figure 4:
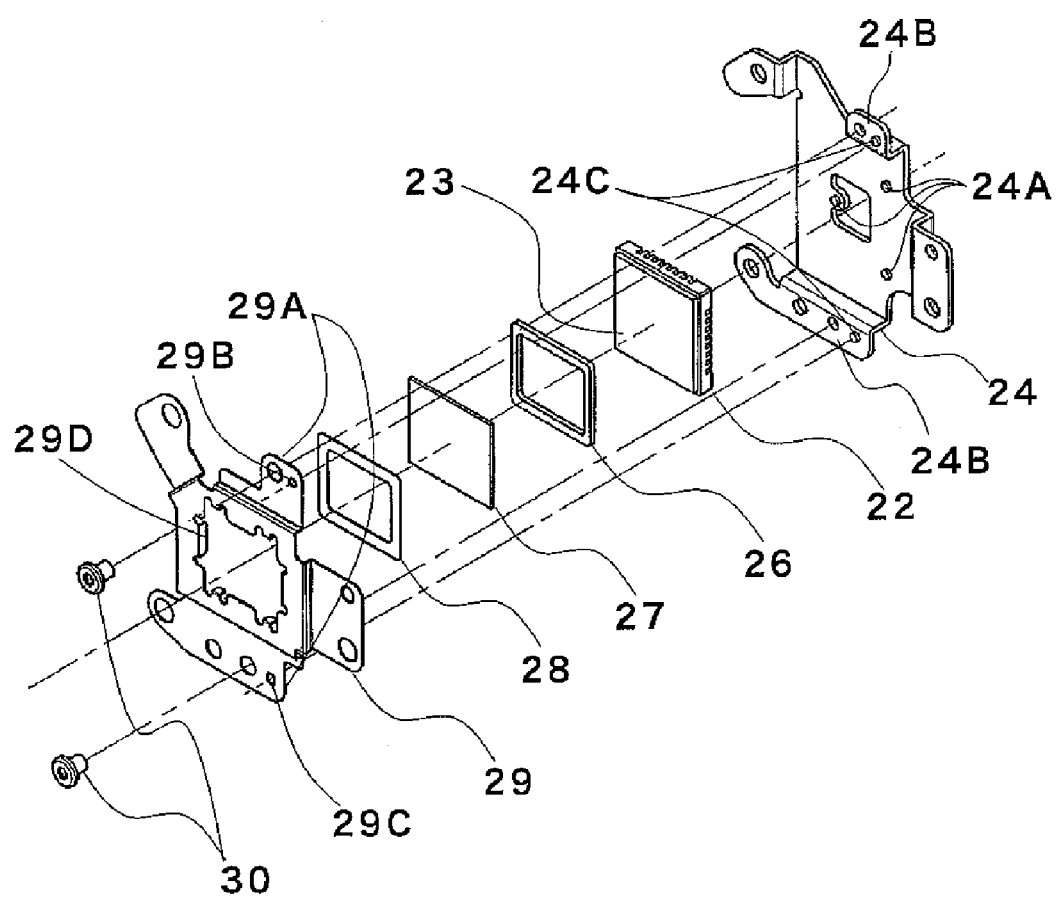
FIG. 4 is an exploded perspective view showing a first example of the arrangement of a CCD and components associated therewith, appearing in FIG. 3.

FIG. 4 is an exploded perspective view showing a first example of the arrangement of the CCD and the components associated therewith, appearing in FIG. 3.

As shown in FIG. 4, the CCD plate 24 has three protrusions 24A. An adhesive is cured in the state of the CCD 22 fixed such that the bottom surface thereof is in contact with the protrusions 24A of the CCD plate 24, whereby the CCD 22 and the CCD plate 24 are integrally combined.

It should be noted that the protrusions 24A have a function of forming a predetermined space between the CCD 22 and the CCD plate 24, where a flexible printed circuit board, not shown, serving as wiring to the CCD 22 is disposed.

The CCD rubber 26 is disposed on the object-side front surface of the protective glass 23, as described hereinbefore. The CCD rubber 26 is made of rubber and held in intimate contact with the protective glass 23. The optical LPF 27 is disposed on the front surface of the CCD rubber 26 in a manner held in intimate contact with the CCD rubber 26.

By disposing the component parts in the above-mentioned order, the protective glass 23 and the optical LPF 27 are sealed by the CCD rubber 26, which prevents dust from adhering to the surface of the protective glass 23. Thus, it is possible to prevent a shadow of dust from being taken in an object image.

Although in the present embodiment, the optical LPF 27 is employed as an optical element to be disposed on the object-side front surface of the protective glass 23, an infrared cut filter or a laminate composed of an infrared cut filter and an optical LPF may be employed. Further, a parallel flat glass having no filtering function may be used, or alternatively an optical lens having power may be used.

Although in the present embodiment, the CCD rubber 26 is formed of rubber, it may be formed of sponge or elastomer. Further, although in the present embodiment, the CCD rubber 26 has a frame-like shape, any shape can be employed insofar as the CCD rubber 26 is capable of sealing between the protective glass 23 and the optical LPF 27. For example, it may be an O ring.

The CCD mask 28 is disposed on the object-side front surface of the optical LPF 27. The CCD mask 28 is provided to prevent light rays except an object image from entering the image pickup surface to form ghosts. Therefore, the CCD mask 28 can be dispensed with, depending on the construction of the photographic optical system.

Furthermore, although in the present embodiment, the CCD mask 28 is disposed in front of the optical LPF 27, it may be disposed between the protective glass 23 and the optical LPF 27.

The LPF cover 29 disposed in front of the CCD mask 28 is formed of a thin metal plate. The LPF cover 29 is coated or plated with a color, such as black, having a low light reflectivity so as to prevent reflection. The CCD plate 24 has two protrusions 24C protruding from a surface 24B as a portion of the surface of the CCD plate 24.

The LPF cover 29 has a hole 29B and a slot 29C formed in respective surfaces 29A and 29A as portions of the surface of the LPF cover 29. The protrusions 24C are fitted in the hole 29B and the slot 29C, respectively, so as to position the LPF cover 29 with respect to the CCD plate 24.

An LPF cover frame part 29D is a frame-shaped part integrally formed with the LPF cover 29 by bending a portion of the LPF cover 29. The LPF cover frame part 29D is formed such that it has a size slightly larger than the CCD mask 28. The CCD mask 28, the optical LPF 27, and the CCD rubber 26 are fitted in the LPF cover frame part 29D, and finally the CCD plate 24 and the LPF cover 29 are fastened to each other by the screws 30.

This combines the CCD 22, the CCD plate 24, the flexible printed circuit board, not shown, the CCD rubber 26, the optical LPF 27, the CCD mask 28, and the LPF cover 29 into a unitary assembly. Hereinafter, the unitary assembly will be referred to as "the CCD unit".

It should be noted that the unitary assembly can be disassembled to the components by removing the screw 30, so that when dust is in the sealed space or when the surface of the protective glass 23 is dirty, it is possible to remove the dust from the space or clean the surface of the protective glass 23 by easily disassembling the unitary assembly.

Figure 5:
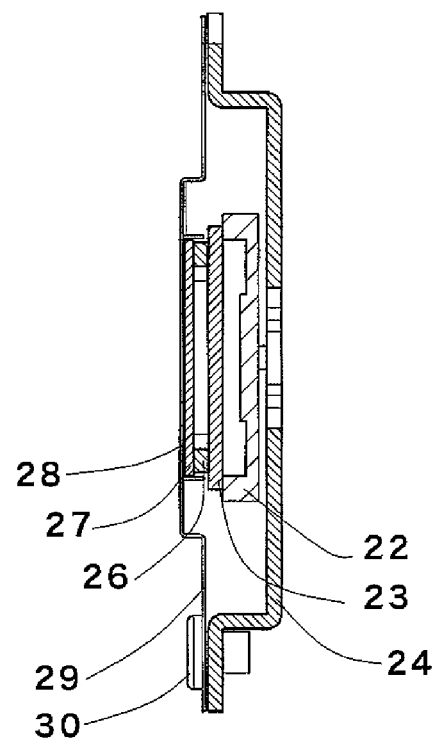
FIG. 5 is a cross-sectional view of the arrangement of the CCD and the components associated therewith in FIG. 3.

FIG. 5 is a cross-sectional view of the arrangement of the CCD and the components associated therewith, appearing in FIG. 3.

FIG. 5 shows the arrangement in which the component parts of the CCD rubber 26 to the LPF cover 29 are disposed on the protective glass 23 in the mentioned order.

The surface 24B of the CCD plate 24 and the surface 29A of the LPF cover 29, appearing in FIG. 4, are originally formed to have a predetermined gap therebetween when the component parts are aligned with each other for assembly. When the screws 30 are tightened, the peripheral portions of the LPF cover 29 are elastically deformed, whereby the surface 24B and the surface 29A are brought into contact with each other to close the gap.

The LPF cover 29 is formed of a thin metal plate. Further, the CCD rubber 26 as an elastic member is disposed on the rear surface of the optical LPF 27 opposite from an object, so that even when the screws 30 are tightened, excessive pressure cannot be applied to the optical LPF 27.

The CCD unit is fastened to the CCD holder 25 by screws. Further, the fixed barrel 19 is fastened to the CCD holder 25, and the CCD holder 25 is fastened to a digital camera body.

The LPF cover 29 formed of a thin metal plate is disposed closer to the object than any other component of the CCD unit, and hence it is possible to reduce the distance between the four-group lens 16 and the optical LPF 27, as shown in FIG. 3.

Figure 6:
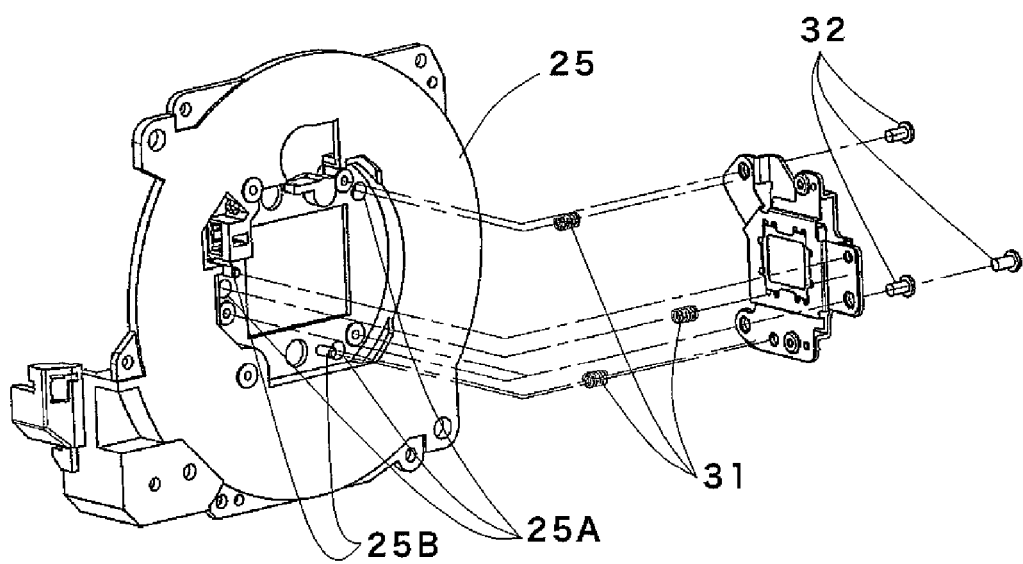
FIG. 6 is an exploded perspective view useful in explaining the assembly structure of a CCD unit and a CCD holder appearing in FIG. 3.

FIG. 6 is an exploded perspective view useful in explaining the assembly structure of the CCD unit and the CCD holder appearing in FIG. 3.

In assembling the CCD unit and the CCD holder 25, first, three compression springs 31 are fitted in respective bottomed holes 25A of the CCD holder 25. Then, the CCD unit is integrated into the CCD holder 25 by using positioning dowels 25B as guides.

At this time, the compression springs 31 come into abutment with the LPF cover 29 to thereby urge the CCD unit away from the CCD holder 25.

When CCD screws 32 are screwed into the CCD holder 25 from the CCD plate side of the CCD unit, the CCD unit moves in accordance with the screwing of the CCD screws 32.

With this arrangement, by changing the screwing amount of the CCD screws 32, it is possible to finely adjust the position of the CCD unit in the optical axis direction. Further, the inclination of the CCD unit can also be finely adjusted by loosening the fitting of the positioning dowels 25B in the CCD unit and thereby changing the screwing amount of each of the three CCD screws 32.

Figure 7:
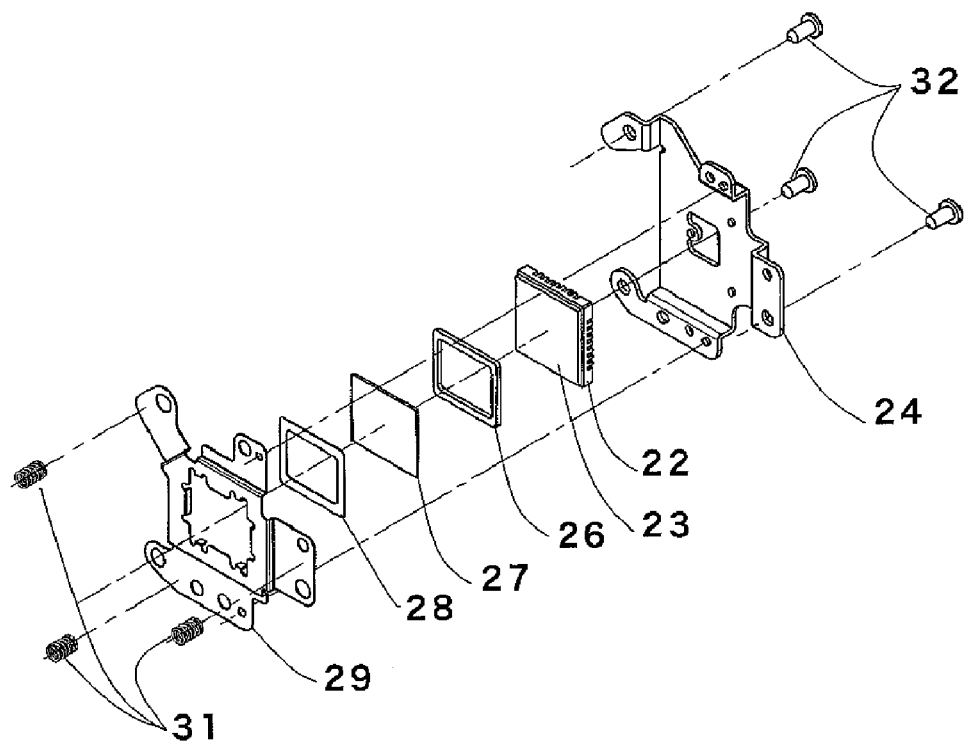
FIG. 7 is an exploded perspective view showing a second example of the arrangement of the CCD and the components associated therewith, appearing in FIG. 3.

FIG. 7 is an exploded perspective view showing a second example of the arrangement of the CCD and components associated therewith, appearing in FIG. 3.

FIG. 7 shows a portion in the second example corresponding to the holding structure of the LPF cover 29 and the CCD plate 24 in FIG. 6, in an exploded state. Since the compression springs 31 press the LPF cover 29, the LPF cover 29 and the CCD plate 24 may be integrally formed, as shown in FIG. 7.

As shown in FIG. 7, the compression springs 31 press the LPF cover 29 toward the CCD plate 24, and the CCD screws 32 press the CCD plate 24 in a direction against the urging force of the compression springs 31.

For this reason, by making the urging force of the compression springs 31 sufficiently large, it is possible to use the compression springs 31 in place of the screws 30 in FIG. 4 to combine the CCD 22, the CCD plate 24, the flexible printed circuit board, not shown, the CCD rubber 26, the optical LPF 27, the CCD mask 28, and the LPF cover 29 into a unitary assembly.

With this arrangement, screws can be dispensed with, which makes it possible to reduce the number of component parts. On the other hand, when the CCD unit is assembled using the screws 30, it is possible to form the CCD unit in a separate process, and therefore the degree of freedom in process design can be enhanced.

In short, the mechanism for holding the optical filter component of the image pickup apparatus according to the present invention makes it possible to select one of the two arrangements in FIGS. 4 and 7 so as to take full advantage of the same.

According to the present invention, it is possible to provide an image pickup apparatus which permits reduction of the thickness of a mechanism for holding an optical filter component and prevents failure of the optical filter component at the same time. Further, according to the present invention, it is possible not only to improve assemblability of the optical filter component and an image pickup element, but also to facilitate separation between the optical filter component and the image pickup element. In addition, it is possible to adjust the position of the image pickup element in the optical axis direction and the inclination of the same with respect to the optical axis.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2007-021131 filed Jan. 31, 2007, which is hereby incorporated by reference herein in its entirety.

What is claimed is:

1. An image pickup apparatus comprising:
    an image pickup unit having;
    an image pickup element configured to convert an object image having passed through an image pickup optical system into an electric signal
    a holding member configured to fix and hold said image pickup element
    a first elastic member disposed on an object-side surface of said image pickup element,
    an optical member disposed on an object-side surface of said first elastic member,
    a second elastic member opposed to said first elastic member such that said second elastic member and said first elastic member sandwich said optical member therebetween, and
    a plurality of first fixing members fixing said second elastic member to said holding member,
    a holder fastened to a lens barrel having said image pickup optical system therein, and
    a plurality of second fixing members fixing said image pickup unit to said holder,
    wherein said first elastic member has a hollow frame shape and is held in intimate contact with said image pickup element and said optical member,
    wherein said second elastic member is fixed to said holding member by said plurality of first fixing members such that said image pickup element, said holding member, said first elastic member, said optical member, and said second elastic member are combined into a unitary assembly,
    wherein said plurality of second fixing members fix said image pickup unit to said holder and allow an inclination of said image pickup unit to be adjustable relative to an optical axis of said image pickup optical system in said lens barrel.

2. The image pickup apparatus as claimed in claim 1, wherein said plurality of first fixing members are screws.

3. The image pickup apparatus as claimed in claim 1, wherein said plurality of first fixing members are compression springs.

* * * * *